United States Patent [19]

Sakoe

[11] Patent Number: 4,872,201
[45] Date of Patent: Oct. 3, 1989

[54] PATTERN MATCHING APPARATUS EMPLOYING COMPENSATION FOR PATTERN DEFORMATION

[75] Inventor: Hiroaki Sakoe, Tokyo, Japan
[73] Assignee: NEC Corporation, Tokyo, Japan
[21] Appl. No.: 657,428
[22] Filed: Oct. 3, 1984
[30] Foreign Application Priority Data
Oct. 4, 1983 [JP] Japan ................................ 58-185402
[51] Int. Cl.$^4$ .............................................. G10L 7/08
[52] U.S. Cl. .................................................... 381/43
[58] Field of Search ...................... 381/41, 42, 43, 44, 381/45; 364/513.5

[56] References Cited

U.S. PATENT DOCUMENTS

| | | | |
|---|---|---|---|
| 4,059,725 | 11/1977 | Sakoe | 381/43 |
| 4,479,236 | 10/1984 | Sakoe | 381/43 |
| 4,570,232 | 2/1986 | Shikano | 364/513.5 |
| 4,670,850 | 6/1987 | Sakoe | 381/43 |

*Primary Examiner*—Gary V. Harkcom
*Assistant Examiner*—John A. Merecki
*Attorney, Agent, or Firm*—Sughrue, Mion, Zinn, Macpeak & Seas

[57] ABSTRACT

A pattern matching apparatus for comparing an input pattern of features with a reference pattern. Address information is stored in the reference pattern along with features, so that branching in a work memory which stores cumulative distances between the input and reference patterns may be effected. In this manner, memory requirements for storing reference patterns are reduced, and the number of required distance calculations also is reduced.

2 Claims, 2 Drawing Sheets

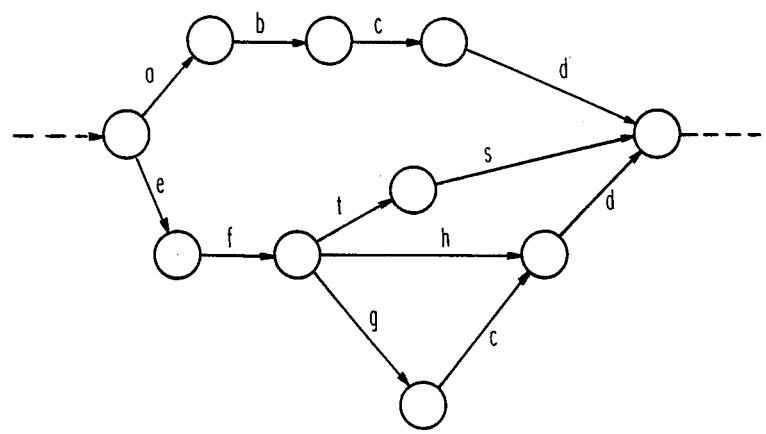
FIG. 1
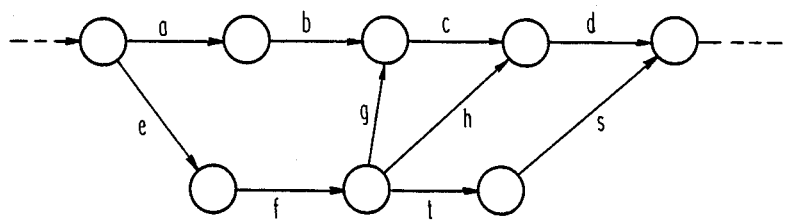
FIG. 2
FIG. 4
| 0 | 0 | 0 | 0 | 1 | ---- | 0 | ---- | 0 | 1 | 1 | 1 | 0 | ---- |
|---|---|---|---|---|---|---|---|---|---|---|---|---|---|
| $b_1$ | $b_2$ | $b_3$ | $b_4$ | $c_{112}$ | ---- | $b_8$ | ---- | $b_{12}$ | $c_{114}$ | $c_{118}$ | $c_{1112}$ | $b_{13}$ | ---- |
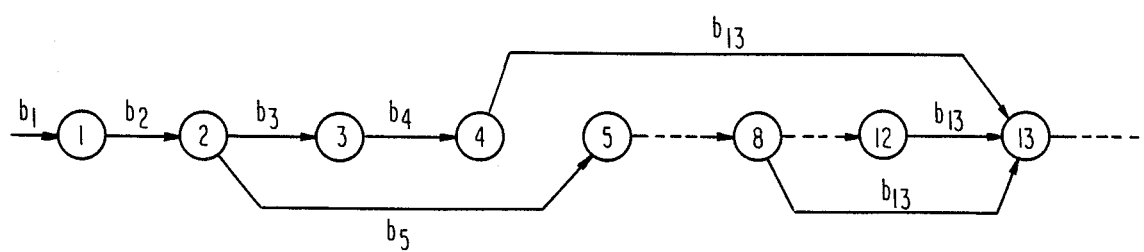
FIG. 5

PATTERN MATCHING APPARATUS EMPLOYING COMPENSATION FOR PATTERN DEFORMATION

BACKGROUND OF THE INVENTION

The present invention relates to an improvement in a pattern matching apparatus used for a character or voice recognition system.

Although the pattern matching system of the invention can be broadly applied to time sequence pattern matching, the following description of the invention will be focussed on speech pattern by way of example.

Usually, a speech pattern can be expressed as a time sequence pattern of features. Speech recognition, therefore, is performed by comparing this time sequence pattern with a reference pattern, i.e., through pattern matching.

For high-accuracy speech recognition, it is necessary to adopt a pattern matching method which has a high pattern fluctuation adjusting capacity. As to distortion caused by time expansion and compression, a pattern matching method called DP (Dynamic Programming) proposed in part by the inventor has been satisfactorily employed. Details of the DP matching method are described in detail in, for example, U.S. Pat. No. 3,816,722, and in a paper by HIROAKI SAKOE and SEIBI CHIBA entitled "Dynamic Programming Algorithm Optimization for Spoken Word Recognition", IEEE TRANSACTIONS ON ACOUSTICS, SPEECH, AND SIGNAL PROCESSING, VOL. ASSP-26, NO. 1, FEBRUARY 1978, pp. 43-49.

Actually, however, speech patterns include various deformations in addition to time expansion and compression distortion. For instance, partial deformation of vowels are often found in continuously uttered speech. Examples of such deformations are: nasalization in which, for example, a term "neck" [nek]is pronounced as [nek]; unvoicing in which, for example, a term "six" [siks] is pronounced as [sik]; omission in which, for example, a term piston [pistn] is pronounced as [pistn]; and elongation of vowels. These deformations do not appear consistently, but occur in quite an unpredictable manner depending on the speed of pronunciation, and phoneme at the preceding or succeeding side of the vowel.

Previously, in order to cope with the deformations of pronounciation, it has been necessary to prepare a plurality of reference patterns corresponding to various possible deformations. Especially for an unlimited number of speakers, a great number of reference patterns should be prepared. Therefore, the reference pattern itself must be quite flexible, and the matching process for comparing the input pattern with the reference pattern must be highly efficient. These are necessary also from the viewpoint of reducing the capacity of the reference pattern memory.

A DP matching method which is capable of solving these problems and which copes with such deformation was proposed (U.S. patent application Ser. No. 631,692, now U.S. Pat. No. 4,670,850) by the inventors of the present invention. In this method, a reference pattern uses a parenthesis type branch-control operator for instructing the branching in the time sequence. The specification says that the portion surrounded by the branching-control operator can be controlled so that several choices or omissions can be made. This method consists of the following basic constitutional requirements, namely, a reference pattern supplying means for supplying a reference feature sequence pattern containing control operators for controlling branching and/or omission; an input pattern supplying means for supplying an input pattern of input feature sequence; a distance computing section for computing the distance between the feature of the input pattern and the reference feature sequence pattern; a work memory having addresses adapted to be selected in accordance with the time point in the reference feature sequence pattern, and adapted to store the cumulative distance; a recurrence formula computing section for executing a DP matching recurrence formula computation in accordance with a plurality of values read out of the work memory and the resulting cumulative distance; a stack for storing the control operator and the position at which the control operator appears; and a stack processing section having a stack control section which, when the control operator is detected, the PUSH/POP operation of the stack in accordance with the kind of the detected control operator, thereby to control the DP matching recurrence formula computation which is to be conducted in the recurrence formula computing section.

However, in this method, it is demanded that a parenthesis appears without contradiction, and, therefore, the range of deformation which can be described by the reference pattern is narrow. A simple example will now be shown. Assume that the following three ways of deformation are permitted in a part of the time sequence of features.

$$\left. \begin{array}{l} \ldots \ a, \ b, \ c, \ d \ \ldots \\ \ldots \ e, \ f, \ t, \ s \ \ldots \\ \ldots \ e, \ f, \ g, \ c, \ d \ \ldots \\ \ldots \ e, \ f, \ h, \ d \ \ldots \end{array} \right\} \quad (1)$$

Such deformation can be expressed as follows by the branching controller used in the above-described method.

$$\ldots \{a \ b \ c \ d/e \ f \ \{t \ s/\{gc/h\ \}d\}\} \quad (2)$$

wherein "{" and "}" means selecting any one of the time sequences enclosed therein and divided by "/" and can be used in accordance with the inserting form.

The automaton expression shown in FIG. 1 corresponds to the reference pattern of the formula (2). This automaton can be simplified. The automaton shown in FIG. 2 is simpler and of the same value. The automaton shown in FIG. 1 requires the 10-state, while the automaton shown in FIG. 2 is described in the 8-state. Namely, a conventional method, in which the branching is expressed by a parenthesis form, has a redundant form in some cases, and requires a large number of memories for storing reference patterns. Moreover, the amount of computation for processing the reference patterns is large.

In addition, the branching-control operator has a limitation that "}" appears after "{", so that a loop-included automaton cannot be expressed.

SUMMARY OF THE INVENTION

An object of the present invention is to provide a pattern matching apparatus capable of carrying out a DP matching operation in accordance with various types of deformation of patterns.

Another object of the present invention is to provide a pattern matching apparatus capable of efficiently DP matching with a reference pattern expressed in a general automaton form.

According to the present invention, a novel pattern matching apparatus can be obtained, which comprises means for supplying a reference pattern consisting of a time sequence of features containing address information, means for supplying an input pattern of time sequence of features, a work memory for storing a plurality of cumulative distances, means for computing a DP matching recurrence formula on the basis of a cumulative distance read out from the work memory, and control means for supplying an address signal to the work memory so as to control the reading address of the work memory based on the address information.

The above and other objects as well as features of the invention will become apparent from the following description.

BRIEF DESCRIPTION OF THE DRAWINGS

FIGS. 1 and 2 show the automatons for use in describing the present invention;

FIG. 4 is a construction diagram of a reference pattern used to describe the embodiment of the present invention; and FIG. 5 shows the automaton in the embodiment of the present invention of FIG. 4.

DETAILED DESCRIPTION OF THE PREFERRED EMBODIMENTS

Figure 3:
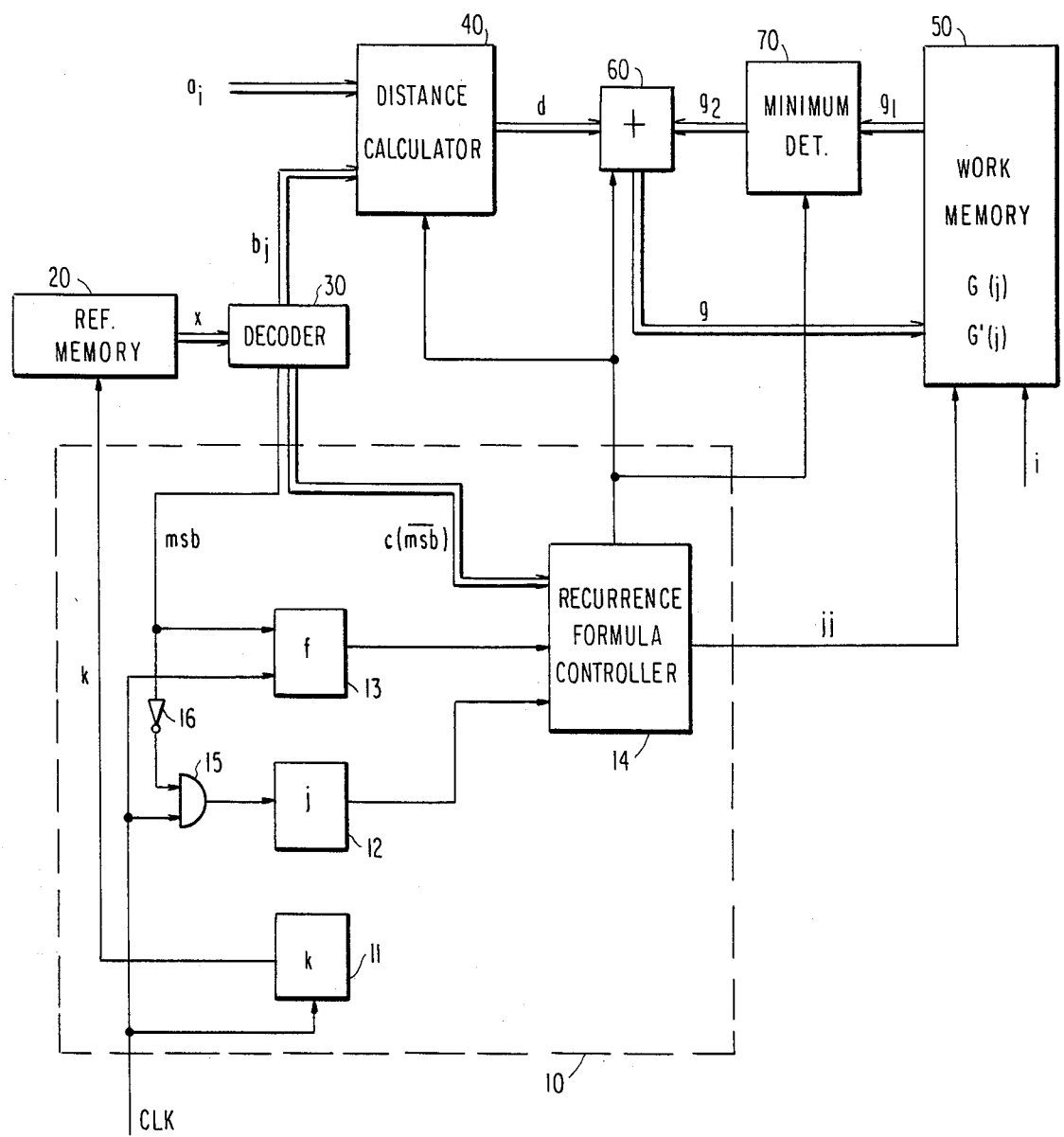
FIG. 3 is a block diagram of a pattern matching apparatus according to an embodiment of the present invention.

The principle of the present invention will now be described in detail with reference to the drawings showing an embodiment thereof.

FIG. 3 is a block diagram of an embodiment of the present invention. The pattern matching is generally done between a plurality of reference patterns and one input pattern. One reference pattern B only will herein be referred to in order to simply describe the invention. In a reference pattern memory 20, such type of reference pattern as shown in FIG. 4 is stored. The address information c is embedded as necessary in the time sequence of features, $$b_1, b_2 \ldots b_j \ldots b_J \tag{3}$$

Let us now think about an example of a reference pattern, $$B = b_1, b_2, b_3, b_4, [2] b_5, \ldots, \tag{4}$$
$$[4] [8] [12] b_{13}, \ldots, b_J$$

The numerical values in the brackets represent the address information. For example, as shown in FIG. 4, discriminating information between the feature and the address information is given to the most significant bit (msb). When the msb is "0" the reference pattern represents a feature; on the other hand, when the msb is "1" the reference pattern represents the address information. The reference pattern expressed by the formula (4) corresponds to the automaton shown in FIG. 5.

The operation of this pattern matching apparatus will now be described. An input pattern is given as the time sequence of features, $A = a_1 a_2 \ldots a_i \ldots a_I$. When the first feature is inputted, the information stored in a work memory 50 is initially set. In this work memory, $G(j)$ and $G'(j)$ representing cumulative distances, which are designated by an address signal j, are stored.

$$G(1) \; G(2) \ldots G(j) \ldots G(J) \tag{5}$$

$$G'(1) \; G'(2) \ldots G'(j) \ldots G'(J)$$

The setting of the initial conditions with respect to the G(1) address is done as follows.

$$G(1) = d(1, 1) \tag{6}$$

This corresponds to the initial setting $g(1, 1) = d(1, 1)$ in a conventional DP matching. The $d(1, 1)$ represents a distance between $a_1$ and $b_1$.

The control section 10 includes counters 11, 12 for counting the number of pulses from a clock CLK, a register 13 for storing the most significant bit (msb) of a signal x from the reference pattern memory 20, and a control section 14 for controlling a DP matching recurrence formula. The counter 11 is adapted to generate an address for designating one feature out of the time sequence features of reference patterns. This address varies in accordance with the clock CLK from 1 to J indicating the final feature of the reference pattern. The counter 12 is adapted to generate an address signal for reading the cumulative distance $G(j)$ stored in the work memory 50. An output of an AND-gate 15 is connected to the input of the counter 12, and one input of the AND-gate 15 is connected to the decoder 30 through an inverter 16. The gate 15 is adapted to count the clock CLK only when the msb of the signal x decoded by a decoder 30 is "1". The register 13 stores the msb of the signal x in response to the clock CLK and supplies the value of the msb for each clock as a control flag f to the recurrence formula control section 14. The counters 11, 12 are reset to "0" when each feature $a_i$ of the input pattern is inputted. The recurrence formula control section 14 generates the following signals in response to the signal c($\overline{msb}$) other than the msb of the signal x and the outputs from the register 13 and counter 12.

(1) When msb=0 and f=0; the address signals j, j-1 are outputted.

(2) When msb=1, and an address signal j and an address signal c corresponding to the address information exclusive of msb among the signals x are outputted.

(3) When msb=0 and f=1; no address signals are generated and signals for actuating a distance calculator 40, an adder 60 and a minimum value detector 70 are outputted.

The operation of the circuit shown in FIG. 3 will now be described.

When the signal x represents the feature $b_j$ with the control flag f, i.e. an output from the register 13 is "0", this signal is judged to be a feature b, and this feature b is sent to the distance calculator 40. The following basic DP recurrence formula is then calculated.

$$g(i, j) = d(i, j) + \min \begin{bmatrix} g(i-1, j) \\ g(i-1, j-1) \end{bmatrix} \tag{7}$$

$$= d + g_2$$

In order to carry out the calculation of this recurrence formula, a signal jj as j and (j-1) are generated and sent to the work memory 50 from the recurrence formula control section 14 on the basis of the signal j from the counter 12 in the control section 10. In the work memory 50, the cumulative distances G(j)=g(i-1, j) and G(j-1)=g(i-1, j-1) are read out in response to the address (i-1) indicating the time point just before the time point i of the feature $a_i$ and the above-mentioned addresses j, (j-1), and sent to the minimum value detecting section 70. The minimum value detecting section 70 compares these values and the detected smaller value is generated as $g_2$. On the other hand, the distance calculating section 40 calculates the distance d(i, j) between the feature $a_i$ of the input pattern and the feature $b_j$ of the reference pattern, and generates a signal d. The adder 60 determines the sum of this signal d and the above-mentioned signal $g_2$. Thus, the calculation of g(i, j) in the formula (7) is carried out. This calculation result is sent to the work memory 50 to be written therein as G'(j)=g(i, j).

After the above calculations of the recurrence formula are completed, the counters 11, 12 are counted up by one, and the similar matching with the following feature $b_{j+1}$ of the reference pattern is carried out. The control flag f remains to "0".

When the address information [2] added to the feature $b_5$ of the reference pattern expressed in the formula (4) is decoded in the decoder 30, the signal generated therein is sent to the control section 10 to carry out the matching operation based on the reference patterns for the time points 2 and 5. Consequently, an address signal jj(j=2) is generated in the recurrence formula control section 14 and sent to the work memory 50. As a result, G(2)=g(i-1, 2) is read from the work memory 50 and sent to the minimum value detecting circuit 70. The counter 11 is then increased by one. The control flag f in the register 13 is set to "1".

When the feature $b_5$ is inputted immediately after the address information [2], f=1, so that the operation different from that of the formula (7) is carried out. The counter 12 outputs j=5 as an address signal. The work memory 50 outputs a recurrence formula value G(5)=g(i-1, 5) in response to this address signal. In the minimum value detecting section 70, this value and the value G(2)=g(i-1, 2) which is inputted thereinto previously are compared, and the smaller value is generated therefrom as a signal $g_2$. In the meantime, the distance d=d(i, 5) between the input feature $a_i$ and the feature $b_5$ of the reference pattern is determined in the distance calculating section 40. The signals d and $g_2$ are added to obtain a value, $$g(i, 5) = d(i, j) + \min \begin{bmatrix} g(i - 1, 2) \\ g(i - 1, 5) \end{bmatrix} \quad (8)$$

This value is written as G'(5)=g(i, 5) in the work memory 50. The counters 11, 12 in the control section 10 are then counted up by one, and the control flag f is reset to "0". Thus, the branching from the state 2 to the state 5 in FIG. 5 is evaluated.

Similarly, for [4] [8] [12] $b_{13}$ of the formula (4), the recurrence formula, $$g(i, 13) = d(i, 13) + \min \begin{bmatrix} g(i - 1, 13) \\ g(i - 1, 4) \\ g(i - 1, 8) \\ g(i - 1, 12) \end{bmatrix} \quad (9)$$

is calculated. Namely, G(4)=g(i-1, 4), G(8)=g(i-1, 8), G(12)=g(i-1, 12) and G(13)=g(i-1, 13) are read out from the work memory 50 in accordance with the address information [4], [8], [12] and $b_{13}$, respectively. The minimum value detecting section 70 determines the minimum value of these values read out, and the resultant value and d=d(i, 13) outputted from the distance calculating section 40 are added.

In general, when a sequence of the reference pattern, $[c_1], [c_2] \ldots [c_m]b_j$ (10)

is given, the recurrence formula, $$g(i, j) = d(i, j) + \min \begin{bmatrix} g(i - 1, j) \\ g(i - 1, c_1) \\ \cdot \\ \cdot \\ \cdot \\ g(i - 1, c_m) \end{bmatrix} \quad (11)$$

is calculated.

When the operation for the feature $b_J$ of the reference pattern is completed the data transfer of G'(j)→G(j) is carried out. Then, a similar operation for $a_i$ is repeated for $a_{i+1}$. Finally, when the operation for $a_I$ is completed, the distance between the input pattern A and reference pattern B is obtained as D(A, B)=G'(J).

According to this arrangement, the free branching can be expressed by setting the address information in [c] in formula (10). In addition, the matching of the reference pattern with the input pattern can be carried out very efficiently.

The above is a description of the principle of the present invention based on an embodiment thereof but the scope of the invention is not so limited. DP recurrence formulae other than the formula (7) are used as basic DP recurrence formulae in some cases. Even in such cases, the principle of the present invention can be applied. For example, when the frequently-used formula, $$g(i, j) = d(i, j) + \min \begin{bmatrix} g(i - 1, j) \\ g(i - 1, j - 1) \\ g(i - 1, j - 2) \end{bmatrix}$$

is used as the formula (7), the recurrence formula, $$g(i,j) = d(i,j) + \min \begin{bmatrix} g(i-1,j) \\ g(i-1, c_1) \\ g(i-1, c_1 - 1) \\ \vdots \\ g(i-1, c_m) \\ g(i-1, c_m - 1) \end{bmatrix}$$

can be used instead of the formula (11). Regarding the construction of the minimum value detecting section 70 and work memory 50, various types of modifications can be easily imagined.

According to the present invention described above, an efficient DP matching apparatus having a comparatively small computation amount and a great effect can be obtained.

What is claimed is:

1. A pattern matching apparatus comprising:
   a work memory having a plurality of memory addresses for storing numerical data;
   a reference pattern memory for storing reference patterns having reference feature data time sequences including address data, said address data specifying branching points in said reference time sequence, said branching points leading to at least two other points within said reference time sequence;
   a control means for generating a first reading address signal indicative of an address of said reference pattern memory, a writing address signal indicative of an address of said work memory and a second reading address signal indicative of an address of said work memory addressed by said address data read out from said reference pattern memory;
   a distance calculating means for calculating a plurality of distances between respective portions of feature data read out from said reference pattern memory addressed by said first reading address signal and feature data of an input pattern, said work memory storing cumulative distances of sum values of the calculated distances as said numerical data accordingly;
   a dynamic programming matching means for calculating a new cumulative distance by performing a dynamic programming (DP) recurrence formula based upon the cumulative distances read out from said work memory addressed by said second reading address signal and writing said new cumulative distance in said work memory at the address designated by said writing address signal; and
   a decoder for judging whether the read out signal from said reference pattern memory is the address data or the feature date and supplying the read out signal to said control means and said distance calculating means when it is the address data and the feature data, respectively, wherein, in response to said address data, said distance calculating means calculates said plurality of distances based on each of said other points leading from said branching points.

2. A pattern matching apparatus according to claim 1, wherein a signal for discriminating between a feature and said address data in said reference pattern is applied to one of the bits of said reference pattern.

* * * * *

UNITED STATES PATENT AND TRADEMARK OFFICE
CERTIFICATE OF CORRECTION

PATENT NO. : 4,872,201

DATED : October 3, 1989

INVENTOR(S) : Hiroaki Sakoe

It is certified that error appears in the above-identified patent and that said Letters Patent is hereby corrected as shown below:

Column 1, line 39, delete "[nek]" and insert --[nẽk]--

Column 1, line 40, delete "[sik]" and insert --[sik̬]--

Column 1, line 41, after "term piston" delete "[pistn]" and insert --[pistǝn]--

Column 4, line 28, after "signal" insert --$\dot{\text{j}}$--

Column 5, line 51, delete "a;and" and insert --$a_i$ and--

Column 5, line 65, delete "2" and insert --②--

Column 5, line 66, delete "5" and insert --⑤-- (1st occurrence)

Column 8, line 16, after "programming" insert --(DP)--

UNITED STATES PATENT AND TRADEMARK OFFICE
CERTIFICATE OF CORRECTION

PATENT NO. : 4,872,201

DATED : October 3, 1989

INVENTOR(S) : Hiroaki Sakoe

It is certified that error appears in the above-identified patent and that said Letters Patent is hereby corrected as shown below:

Column 8, line 27, delete "date" and insert --data--

Signed and Sealed this

Fourth Day of September, 1990

*Attest:*

HARRY F. MANBECK, JR.

*Attesting Officer*     *Commissioner of Patents and Trademarks*